Patented May 13, 1930

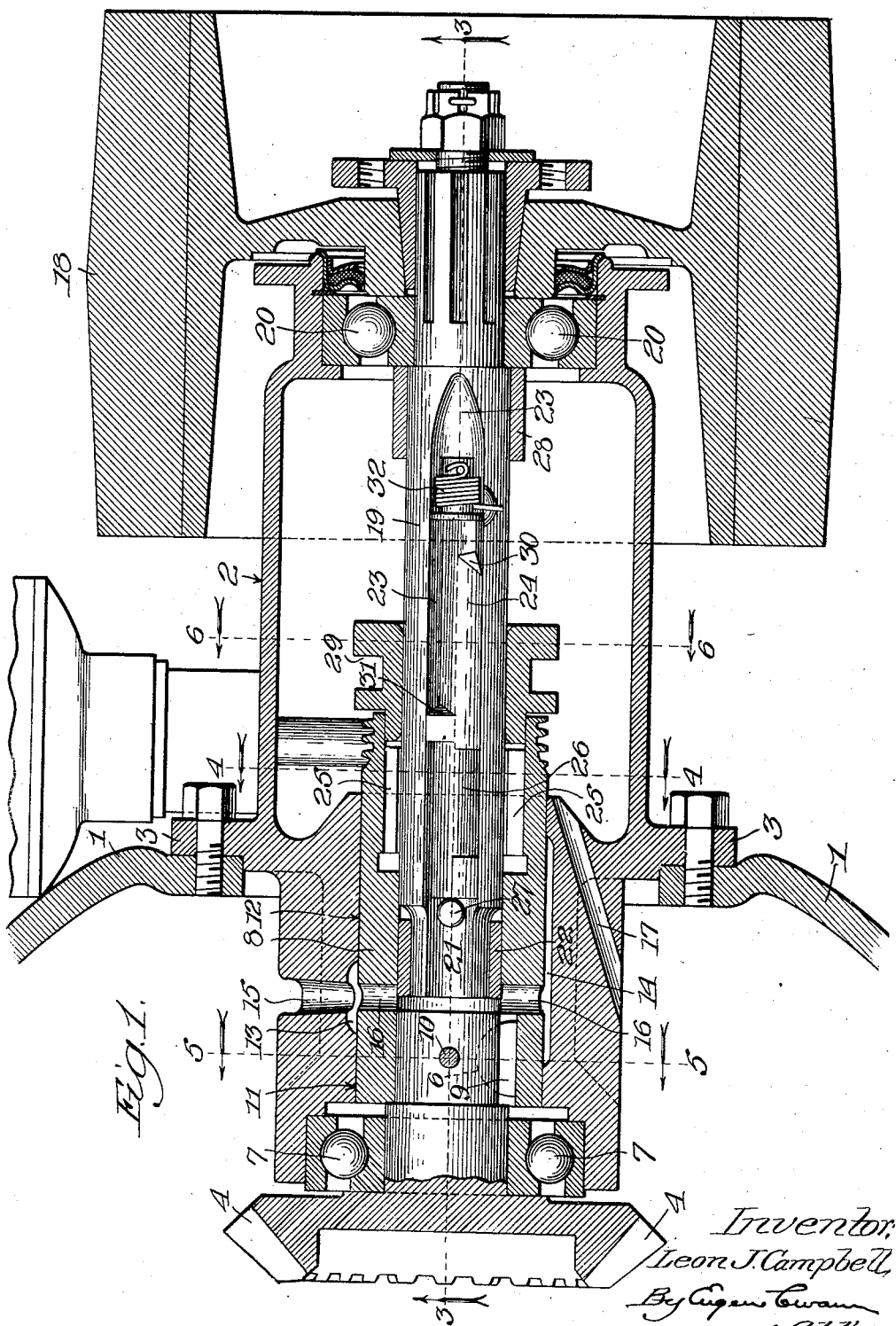

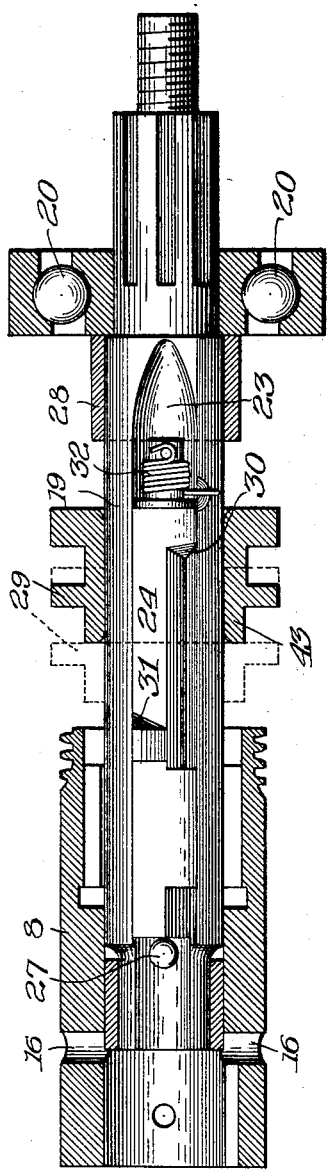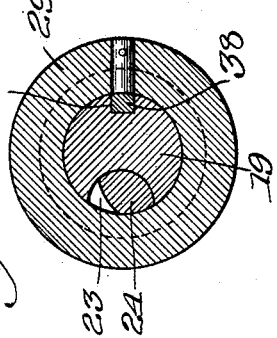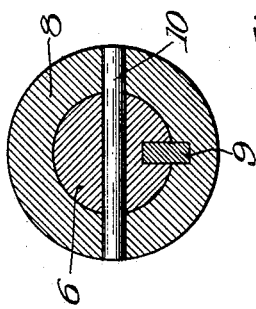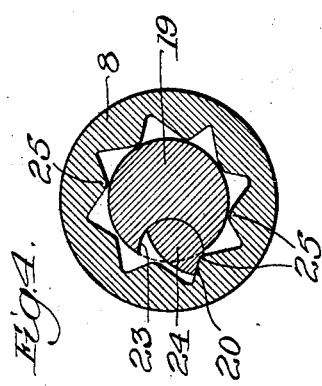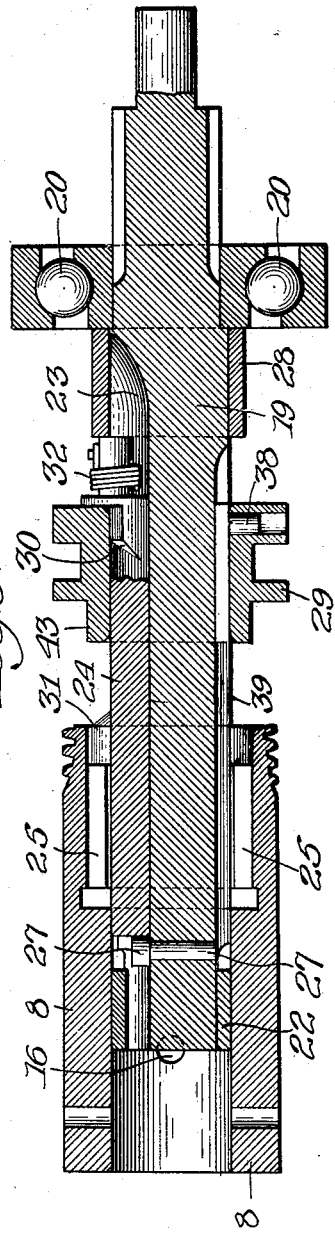

1,758,352

UNITED STATES PATENT OFFICE

LEON JAY CAMPBELL, OF BUCHANAN, MICHIGAN

POWER TAKE-OFF UNIT FOR TRACTORS

Original application filed October 4, 1926, Serial No. 139,250. Divided and this application filed March 17, 1927. Serial No. 176,086.

This invention relates to power take-offs for tractors, and more particularly for Fordson tractors, so that the tractor may be provided with a belt pulley or other power delivery member by means of which stationary or other machinery may be operated by the tractor engine.

In power take-offs as heretofore made and used, the clutch of the unit can not be released while the unit is under load without first disengaging the clutch of the tractor, due to the fact that the clutch mechanism of the unit when under load strains is not releasable. Consequently, considerable delay is caused in releasing the clutch, which delay might be very serious in the case of accidents to the operator or to the machine driven by the tractor. Moreover, in these units, the clutch mechanism can not be operated independently of the main clutch of the tractor, thus requiring that they be worked together, due to the fact that they can not be engaged or disengaged without a corresponding operation of the tractor clutch, thus making the device inconvenient to operate with many operations and many operators. Then again, in these units as heretofore placed on the market, the driving and driven shafts have not been supported in a manner to keep their meeting or adjacent ends in proper alignment on the application of power or undue strains thereon. This places unnecessary wear and strains on the bearings and gears and causes the shafts to weave, thereby giving the belt operating on the belt pulley a wabbling or whipping action, with resultant loss of power and undue wear on the bearings of both the unit and the machinery driven thereby.

The object of my invention is to provide a power take-off unit which overcomes the objections heretofore noted and also to provide a type of clutch for the unit which may be operated independently of the clutch of the tractor whenever desired, thereby allowing the unit to be readily released from the power element of the tractor without being required to disengage the tractor clutch. This allows the unit to be disengaged from the tractor the instant desired, thereby making the device much safer than as heretofore constructed and much more flexible, in that the power may be cut off instantly by releasing the clutch in the unit, which is an especial advantage when it is considered that devices of this character are operated by unmechanical and inexperienced users.

The invention as claimed in the present application, which is a division of my copending application Serial No. 139,250, filed October 4, 1926, has reference to the means which I have devised for rocking the clutch key to move its lug into and out of clutched engagement with the associated sleeve or rotary member.

In the accompanying drawings—

Fig. 1 is a longitudinal vertical sectional view taken through a power take-off unit constructed in accordance with my invention;

Fig. 2 is an elevational view of the driving and driven shaft assembly with parts in section;

Fig. 3 is a longitudinal vertical sectional view through said shaft assembly on line 3—3 of Fig. 1; and Figs. 4, 5, and 6 are transverse vertical sectional views taken on lines 4—4, 5—5, and 6—6, respectively, of Fig. 1.

In the drawings, 1 indicates the tractor housing having an opening through which the inner end of the casing 2 of my improved unit is inserted, as shown in Fig. 1. This casing has a surrounding flange 3, so that it may be secured to the tractor housing, with the casing 2 extending outward therefrom, as shown. Said casing 2 is preferably in the form of a one-piece casting and has a length to extend from end to end of the unit.

At the inner end of the casing 2, that is, the end within the tractor housing 1, there is a beveled gear 4, which meshes with a beveled gear (not shown) of the tractor transmission. The hub of the gear 4 is made in the form of a stub shaft 6, which extends into the adjacent end of the casing 2. An antifriction bearing 7 is mounted in the inner end of the casing 2 to support the shaft 6, as shown. The inner end of the shaft 6 extends into a sleeve 8 journaled in the casing 2, the shaft 6 being fixed to the sleeve by a key 9 and a pin 10, the latter holding the parts against endwise displacement. (See Figs. 1 and 5.)

The casing 2 is provided with a bore to receive and support the sleeve 8. This bore extends along the length of the sleeve and provides a relatively wide bearing surface therefor. This surface in total is wide enough to properly support the sleeve and maintain it in correct axial alignment with the gear 4 and the driven shaft, to be presently described, and also to provide sufficient metal in the bearing to carry off all heat likely to be produced during the rotation of the sleeve. By making this bearing wide enough, there is no improper wearing of the teeth of the bevel gears, thus prolonging the life of the unit and making a quiet running mechanism.

The bearing surfaces mentioned are marked 11, 12 in the drawings, and these are separated by an annular oil groove 13 made in the bore and surrounding the sleeve. This groove communicates with an oil well 14 formed as a longitudinal groove in the lower portion of the bore along the under side of the sleeve 8, as shown in Fig. 1. The casing 2 has an inlet opening 15 on its upper side for feeding lubricant from the tractor housing to the groove and well 13, 14, respectively. The sleeve 8 has oil holes 16 in register with the groove 13, so that oil may flow into the interior of the sleeve. The casing 2 has an oil outlet passage 17 in its under side so as to return oil from the interior of the casing 2 to the supply in the tractor housing 1.

A belt pulley 18 or other power delivery member is located at the outer end of the casing 2. This pulley is fixed to the outer end of a driven shaft 19 in any suitable manner so as to be rotated thereby. The shaft 19 extends into the casing 2 through an antifriction bearing 20 mounted in the outer end of the casing, as shown. The shaft 19 extends into the sleeve 8 and terminates just short of the portion of the shaft 6 within the sleeve, as shown in Fig. 1. At such point the shaft 19 is reduced, as a 21, and is supported in the sleeve 8 by a relatively wide bronze bushing 22, which is fitted in the sleeve, as shown.

The shaft 19 is provided with a concave groove or key seat 23 extending lengthwise thereof and in that portion extending inside and outside of the sleeve 8, respectively. Rockably mounted in this groove is a key 24 extending substantially the full length of the groove or key seat, as shown in Figs. 1, 2, and 3. The key 24 thus has a portion within and outside the sleeve, respectively. The end of the sleeve 8 where the shaft 19 extends into it is provided with a plurality of internal projections 25, as clearly shown in Fig. 4. The key 24 is provided with a locking lug 26 adapted in the rocking of the key to be turned into and out of clutched engagement with the projections 25. (See Fig. 4.)

When the key is rocked axially in one direction, the lug 26 is disengaged from the projections 25 so as to disconnect the sleeve 8 from the shaft 19 and thus permit the gear 4 to be rotated by the tractor engine without imparting power to the pulley 18. When the key is rocked in the opposite direction, the lug 26 is extended up into the space between two of the projections 25 and locks or clutches the sleeve 8 to the shaft 19 so that power may be transmitted from the tractor engine to the pulley 18. The key 24 is held against endwise movement by a pin 27 and a collar 28 at the opposite ends of the key. The pin 27 is driven into the shaft 19 at the front of the key, while the collar 28 has a tight fit on the shaft at the rear end of the key, as shown in Figs. 1, 2, and 3. The pin 27 is located in the key groove 23 so as to be within the bushing 22, as clearly shown in Fig. 3.

The mechanism so far described constitutes the subject-matter of my said copending application.

To rock the key, a shift collar 29 is slidably mounted on the portion of the shaft 19 outside of the sleeve 8. The key 24 has a pair of cam projections 30, 31 arranged on opposite sides of its longitudinal axis and on opposite sides of the collar 29 so that the collar on being slid endwise on the shaft will rock the key by riding over these projections. When the collar 29 slides over the projection 30, the key is rocked to disconnect the sleeve 8 from the shaft 19 (see Fig. 3); whereas, when the collar is slid over the other projection 31, the key is rocked to connect the sleeve 8 with the shaft 19. (See Fig. 1.)

A spring 32 is coiled about the rear end of the key 24 and has one end connected with the key and the other end bearing against the shaft 19. This spring constantly tends to rock the key in a direction to turn its lug 26 into locking or clutching position. The collar 29 has a width less than the distance between the projections 30, 31, so that said collar may be free of both projections when in a position between them, as shown in dotted lines in Fig. 2. Thus the spring 32 may act to rock the key into clutched engagement with the sleeve 8 after the collar frees the projection 30, but before it acts on the projection 31. Should the spring break or fail to properly rock the key, the operation will be positively effected on shifting the collar 29 over the projection 31. The outer contour of the key adjacent each cam projection conforms to the curvature of the bore of the collar so that the key is held from rocking while the collar is over either projection, as shown in Fig. 6.

To slide the shift collar 29 on the shaft 19, I provide a shift lever (not shown) extending up out of the top of the casing 2 and within convenient reach of the operator. This lever is pivoted in the casing between its ends and carries a shoe at its lower end with the shoe fitting in the annular groove in the outer periphery of the collar so that the latter may be slid back and forth by the lever. The shift collar 29 is keyed to the shaft 19 so as to rotate therewith and thus prevent burning the cam faces of the projections 30, 31. This connection comprises a pin 38 carried by the collar 29 and extending into an elongated slot 39 in the shaft 19, as shown in Fig. 3. A spring pressed check device (not shown) is carried by the casing 2 at one side of the shift lever and cooperates therewith in a manner to hold the lever in either of its shifted positions. I employ a latch member (not shown) which is engageable with the operating lever of the tractor clutch to hold the shift lever from being accidentally moved into clutch engaging position.

The sleeve 8 in being keyed or fixed to the stub shaft 6 of the gear 4, constitutes in effect the driving shaft of the unit. By providing a relatively wide bearing (11—12) for this shaft in the casing 2 and having the driven shaft 19 supported in the sleeve by a relatively wide bushing 22, the driving and driven shafts are supported in correct axial alignment at all times so that there is no opportunity afforded for these shafts to run eccentric and cause undue wear on the bearings or the teeth of the bevel gears, or throw the pulley 18 out of proper running position. The shift collar 29 is provided on its side toward the sleeve 8 with an annular projection 43 of a diameter to enter the sleeve when the collar is shifted into driving position, as shown in Fig. 1. This projection 43 fits within the sleeve where it extends into the same and serves to maintain the sleeve and driven shaft 19 in axial alignment. The sleeve 8 is recessed to accommodate the projection 43.

With the key type of clutch as shown and described, the driving and driven shafts 8 and 19 of the unit may be readily and easily disconnected without the necessity of first disengaging the clutch of the tractor, as heretofore, for the reason that the clutch key 24 is rolled down out of engagement with the sleeve 8 regardless of the load strains on the shafts or their speed of rotation. Thus, the clutch key 24 may be operated whenever desired, independently of the tractor clutch, with the result that the machine or other device driven by the tractor may be quickly and easily disconnected therefrom without the delay incident to mounting the tractor and throwing out the tractor clutch, as heretofore. This is an important feature of my invention, because it provides a safety factor in case of accident either to the machine driven by the tractor or to the operator attending the same, as the machine may be quickly disconnected from the tractor by simply releasing the clutch of the unit.

The details of construction shown and described may be variously changed and modified without departing from the spirit and scope of my invention.

I claim as my invention:

1. In a power transmitting device, the combination with a shaft, of a rotary member surrounding the shaft, a clutch key rockably mounted on the shaft and held against endwise movement thereon, said key having a cam projection, a shift collar slidably mounted on the shaft over the key and moving the same out of clutched engagement with said rotary member upon sliding the collar over said projection, and spring means about one end of the key and acting thereon to move the key into clutched engagement with the rotary member on sliding the collar off of said cam projection.

2. In a power transmitting device, the combination with a shaft, of a rotary member surrounding the same, a clutch key rockably mounted on the shaft and held against endwise movement thereon, said key having opposed cam projections on opposite sides of its longitudinal axis, a shift collar slidably mounted on the shaft over the key and cooperating with said projections to effect the movement of the key into and out of clutched engagement with said rotary member, and spring means acting on the key to move the same into clutched engagement with the rotary member when the collar is free of both cam projections, said collar having a width less than the distance between said projections.

3. In a power transmitting assembly, the combination with a shaft, of a rotary member bored to receive the shaft and surround the same, a clutch key rockably mounted on the shaft for releasably connecting the rotary member thereto, opposed cam projections on the key, a shift collar slidably mounted on the shaft over the key between said projections and adapted to effect the movement of the key into and out of clutched engagement with the rotary member in the sliding of the collar over said projections, said collar having an annular projection to enter and fit within the bore of the rotary member to support the same when the key clutches the rotary member to the shaft.

In testimony whereof I affix my signature this 4th day of March, 1927.

LEON JAY CAMPBELL.